United States Patent
Zhang et al.

(10) Patent No.: US 8,861,693 B2
(45) Date of Patent: Oct. 14, 2014

(54) PHONE NUMBER MANAGEMENT METHOD AND COMMUNICATION DEVICE HAVING PHONE NUMBER MANAGEMENT FUNCTION

(71) Applicants: Fu Tai Hua Industry (Shenzhen) Co., Ltd., Shenzhen (CN); Hon Hai Precision Industry Co., Ltd., New Taipei (TW)

(72) Inventors: Jin-Peng Zhang, Shenzhen (CN); An-An Pan, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/846,936

(22) Filed: Mar. 18, 2013

(65) Prior Publication Data

US 2013/0251128 A1 Sep. 26, 2013

(30) Foreign Application Priority Data

Mar. 26, 2012 (CN) .......................... 2012 1 0081223

(51) Int. Cl.
- *H04M 1/56* (2006.01)
- *H04M 15/06* (2006.01)
- *H04M 1/2745* (2006.01)
- *H04M 1/27* (2006.01)

(52) U.S. Cl.
CPC .............. *H04M 1/27* (2013.01); *H04M 1/2745* (2013.01); *H04M 1/274516* (2013.01)

USPC ................................... 379/142.01; 455/414.1

(58) Field of Classification Search
CPC ............................... H04M 1/27; H04M 1/275
USPC ........ 379/142.01, 142.06, 201.01; 455/412.1, 455/414.1
See application file for complete search history.

(56) References Cited

U.S. PATENT DOCUMENTS

| | | | | |
|---|---|---|---|---|
| 5,636,267 | A * | 6/1997 | Utsumi et al. | 379/88.01 |
| 6,687,362 | B1 * | 2/2004 | Lindquist et al. | 379/218.01 |
| 7,752,282 | B2 * | 7/2010 | Noda | 709/217 |
| 7,904,459 | B2 * | 3/2011 | Grigsby et al. | 707/740 |
| 2006/0079202 | A1 * | 4/2006 | Doan et al. | 455/411 |
| 2006/0229063 | A1 * | 10/2006 | Koch | 455/414.1 |
| 2006/0282450 | A1 * | 12/2006 | Barnes | 707/101 |
| 2008/0247527 | A1 * | 10/2008 | Nagata | 379/142.06 |
| 2009/0036163 | A1 * | 2/2009 | Kimbrell | 455/558 |
| 2009/0268892 | A1 * | 10/2009 | Wong et al. | 379/142.06 |
| 2010/0261463 | A1 * | 10/2010 | Collet et al. | 455/414.1 |
| 2011/0244838 | A1 * | 10/2011 | Chang | 455/414.1 |

\* cited by examiner

*Primary Examiner* — Quoc D Tran

(74) *Attorney, Agent, or Firm* — Novak Druce Connolly Bove + Quigg LLP

(57) ABSTRACT

A computerized method for managing phone numbers stored in a communication device, the communication device communicates with a communication service terminal provided by a telecommunication company. The communication device sends a request message for requesting to acquire a usage state of each of the phone numbers to the communication service terminal, and then detects which of the phone numbers have the usage state that matches one or more predetermined states. Any detected phone number which usage state matches the one or more predetermined states is deleted from the communication device.

16 Claims, 2 Drawing Sheets

PHONE NUMBER MANAGEMENT METHOD AND COMMUNICATION DEVICE HAVING PHONE NUMBER MANAGEMENT FUNCTION

BACKGROUND

1. Technical Field

Embodiments of the present disclosure relate to a phone number management method of a communication device.

2. Description of Related Art

Numerous phone numbers of different contacts may be stored in a communication device. To remove an obsolete number, the user may manually delete it from the communication device. However, this manner of manually deleting the phone numbers which are unused or no longer needed maybe inconvenient for the user. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
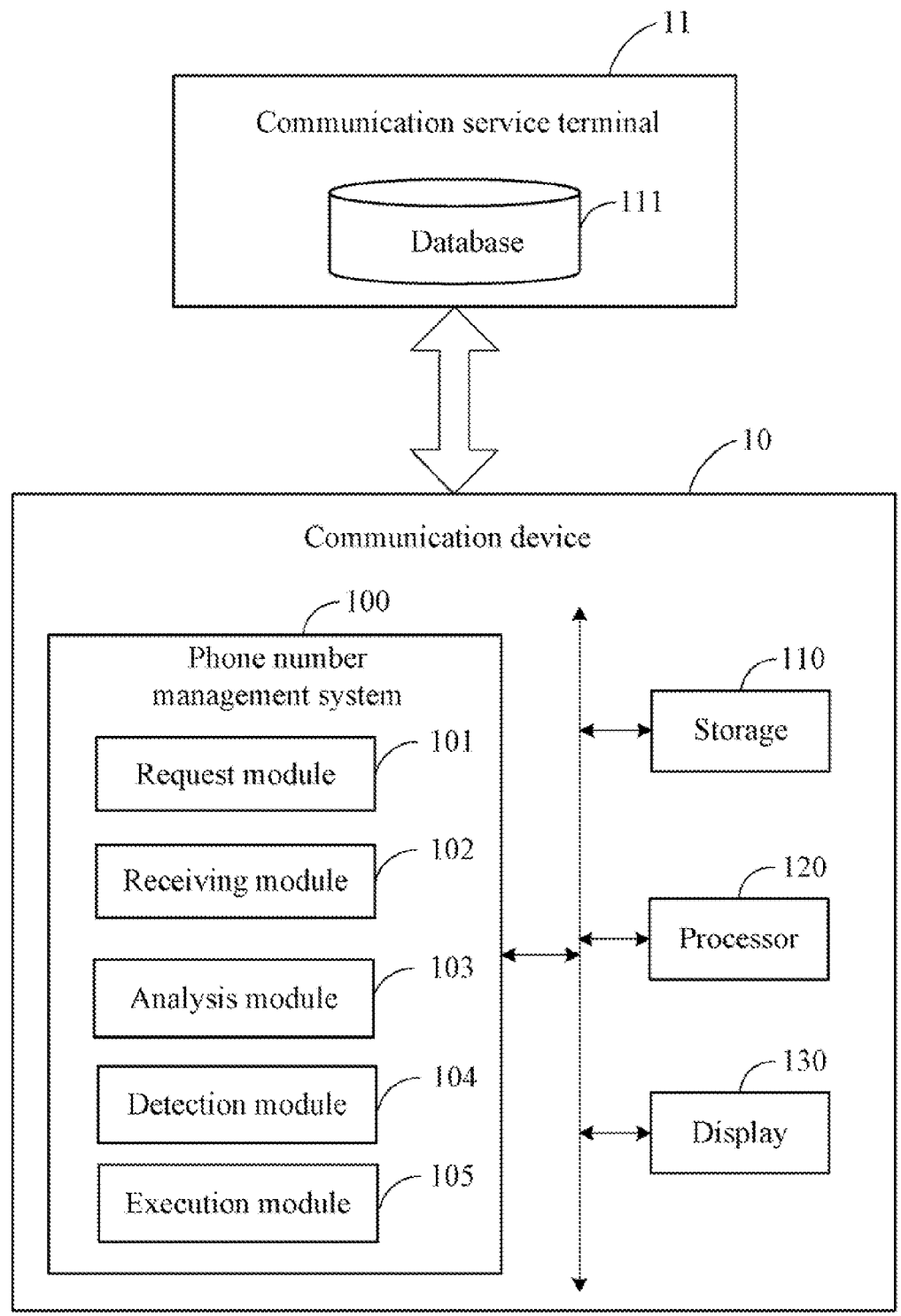
FIG. 1 is a schematic block diagram illustrating one embodiment of a communication device which communicates with a communication service terminal

FIG. 1 is a schematic block diagram illustrating one embodiment of a communication device 10 which communicates with a communication service terminal 11. In the embodiment, the communication service terminal 11 may for example be provided by a telephone service provider. The communication device 10 includes a phone number management system 100, a storage 110, a processor 120, and a display 130. The communication device 10 may be, for example, a smart phone, a personal digital assistant, a fixed telephone, or other similar device.

The phone number management system 100 is configured for managing phone numbers stored in the communication device 10. The phone number management system 100 may include a plurality of programs in the form of one or more computerized instructions stored in the storage 110 and executed by the processor 120 to perform operations of the communication device 10. In the embodiment, the phone number management system 100 includes a request module 101, a receiving module 102, an analysis module 103, a detection module 104, and an execution module 105.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 2:
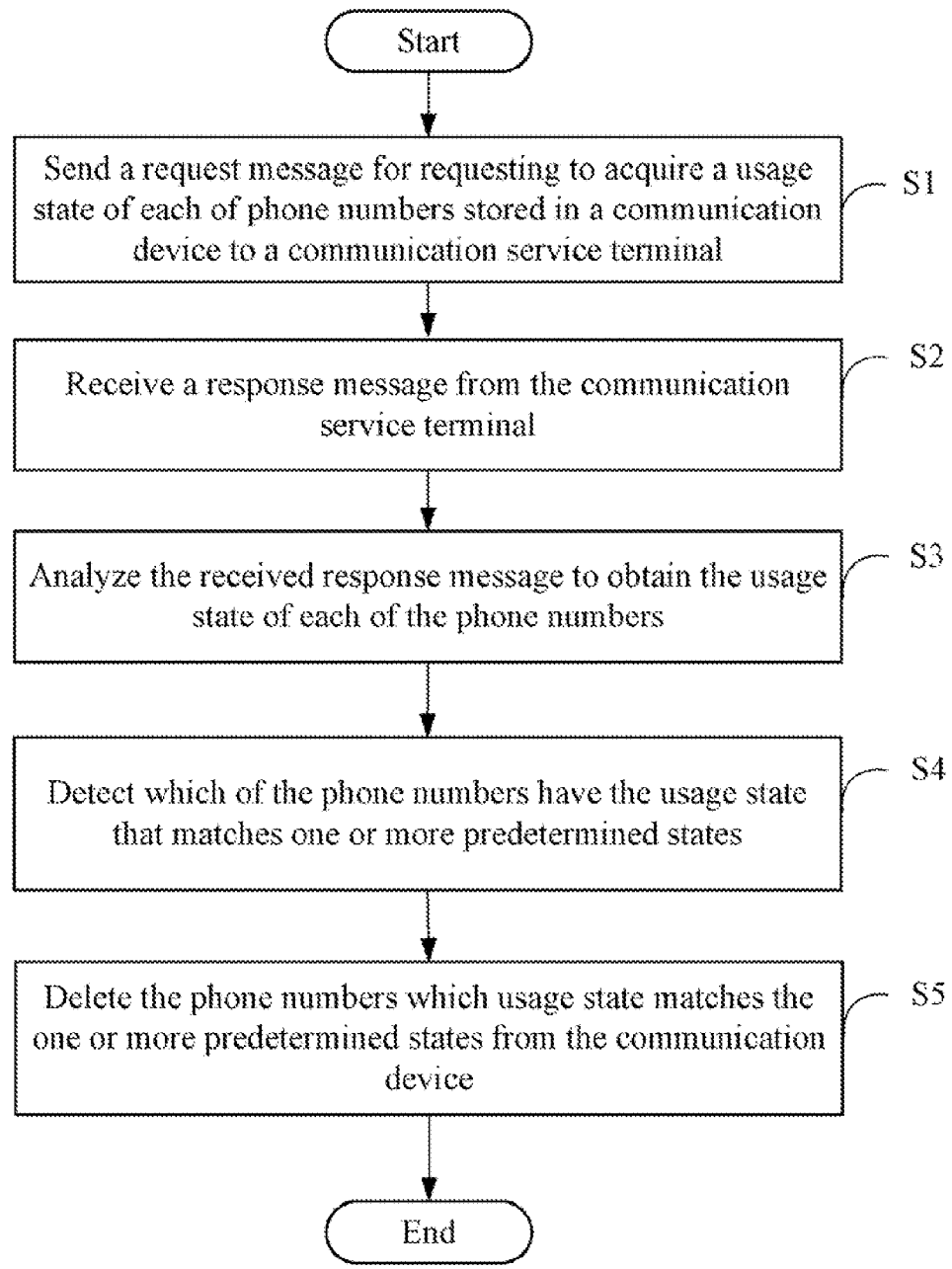
FIG. 2 is a flowchart of one embodiment of a phone number management method of the communication device of FIG. 1.

Referring to FIG. 2, a flowchart of one embodiment of a method for managing phone numbers stored in the communication device 10 using the phone number management system 100 of FIG. 1 is shown. Depending on the embodiment, additional steps may be added, others removed, and the ordering of the steps may be changed.

In step S1, the request module 101 sends a request message for requesting to acquire a usage state of each phone number stored in the communication device 10 to the communication service terminal 11. In the embodiment, the phone numbers are stored in the storage 110 of the communication device 10. The usage state may be one of a number of predefined states, such as, "does not exist," "normal used," "overdue," "powered off," "busy," and "out of service." The request message has a first predetermined format and includes the phone numbers stored in the communication device 10. For example, the request message may be a text message of "ZTCX#135xxxx8888, 134xxxx6666, 135xxxx9999, . . . ". The request module 101 may send the request message at predetermined time intervals, such as, every two or three weeks. When the communication service terminal 11 receives the request message, the communication service terminal 11 may search its database 111 for the usage state of each phone number of the request message, and sends a response message including the usage state of each of the phone numbers to the communication device 10.

In step S2, the receiving module 102 receives the response message from the communication service terminal 11. The response message may have a second predetermined format and include the usage state of each of the phone numbers included in the request message. For example, the response message may be a text message of "135xxxx8888: does not exist, 134xxxx6666: overdue, 135xxxx9999: busy, 136xxxx9999: normal used, . . . ".

In step S3, the analysis module 103 analyzes the received response message to obtain the usage state of each of the phone numbers.

In step S4, the detection module 104 detects which of the phone numbers have a usage state that matches one or more predetermined states, the one or more predetermined states being selected from the number of predefined states. For example, the one or more predetermined states may be "does not exist." Particularly, in other embodiments, if none of the phone numbers has a usage state that matches the one or more predetermined states, the process terminates.

In step S5, the execution module 105 deletes the phone numbers which usage state matches the one or more predetermined states from the communication device 10, the deleted phone numbers being one or more. When any of the phone numbers has been deleted, the execution module 105 may further display a notification message including the deleted phone numbers on the display 130 to notify a user.

In addition, the execution module 105 may mark each of the phone numbers in the communication device 10 using different colors according to the usage state of each of the phone numbers. Thus, the user would know the usage state of each of the phone numbers stored in the communication device 10 according to the different colors used to mark the phone numbers. For example, the phone number "136xxxx9999" that has the usage state of "normal used" may be marked as green, the phone number "135xxxx9999" that has the usage state of "busy" may be marked as yellow, and the phone number "134xxxx6666" that has the usage state of "overdue" may be marked as red.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for managing phone numbers stored in a communication device, the communication device in communication with a communication service terminal provided by a telephone service provider, the method comprising:

sending a text message having a first predetermined format and comprising at least one phone number stored in the communication device for requesting to acquire a usage state of each of the phone numbers to the communication service terminal, the usage state being one of a number of predefined states;

receiving a response message from the communication service terminal;

analyzing the received response message to obtain the usage state of each of the phone numbers;

detecting which of the phone numbers have the usage state that matches one or more predetermined states, the one or more predetermined states being selected from the number of predefined states; and deleting the phone numbers which usage state matches the one or more predetermined states from the communication device.

2. The method according to claim 1, wherein the response message is a text message having a second predetermined format and comprising the usage state of each of the phone numbers comprised in the request message.

3. The method according to claim 1, further comprising:

marking each of the phone numbers in the communication device using different colors according to the usage state of each of the phone numbers.

4. The method according to claim 1, wherein the request message is sent to the communication service terminal at predetermined time intervals.

5. The method according to claim 1, wherein the a number of predefined states comprise: "does not exist," "normal used," "overdue," "powered off," "busy," and "out of service."

6. The method according to claim 5, wherein the one or more predetermined states are selected from the number of predefined states, and the one or more predetermined states comprise: "does not exist."

7. The method according to claim 1, wherein when the communication service terminal receives the request message, the communication service terminal searches its database for the usage state of each of the phone numbers, and sends the response message comprising the usage state of each of the phone numbers to the communication device.

8. The method according to claim 1, further comprising:

displaying a notification message on a display of the communication device to notify a user when any of the phone numbers has been deleted, the notification message comprising the deleted phone numbers.

9. A communication device in communication with a communication service terminal provided by a telecommunication company, the communication device comprising:

a storage configured for storing a plurality of phone numbers;

a processor; and a phone number management system stored in the storage and executed by the processor, the phone number management system comprising:

a request module that sends a text message having a first predetermined format and comprising at least one phone number stored in the storage for requesting to acquire a usage state of each of the phone numbers to the communication service terminal, the usage state being one of a number of predefined states;

a receiving module that receives a response message from the communication service terminal;

an analysis module that analyzes the received response message to obtain the usage state of each of the phone numbers;

a detection module that detects which of the phone numbers have the usage state that matches one or more predetermined states, the one or more predetermined states being selected from the number of predefined states; and an execution module that deletes the phone numbers which usage state matches the one or more predetermined states from the communication device.

10. The communication device according to claim 9, wherein the response message is a text message having a second predetermined format and comprising the usage state of each of the phone numbers comprised in the request message.

11. The communication device according to claim 9, wherein the execution module further marks each of the phone numbers in the communication device using different colors according to the usage state of each of the phone numbers.

12. The communication device according to claim 9, wherein the request module sends the request message to the communication service terminal at predetermined time intervals.

13. The communication device according to claim 9, wherein the predefined states comprise: "does not exist," "normal used," "overdue," "powered off," "busy," and "out of service."

14. The communication device according to claim 13, wherein the one or more predetermined states are selected from the number of predefined states, the one or more predetermined states comprise: "does not exist."

15. The communication device according to claim 9, wherein when the communication service terminal receives the request message, the communication service terminal searches its database for the usage state of each of the phone numbers, and sends the response message comprising the usage state of each of the phone numbers to the communication device.

16. The communication device according to claim 9, wherein the execution module further displays a notification message on a display of the communication device to notify a user when any of the phone numbers has been deleted, the notification message comprising the deleted phone numbers.

* * * * *